Oct. 16, 1962  R. D. MORROW  3,058,389

PHOTOMETERS

Filed July 5, 1955

INVENTOR
Robert D. Morrow his attorneys

United States Patent Office 3,058,389
Patented Oct. 16, 1962

3,058,389
PHOTOMETERS
Robert D. Morrow, Pittsburgh, Pa., assignor to Morrow Products, Inc., Pittsburgh, Pa., a corporation of Pennsylvania
Filed July 5, 1955, Ser. No. 519,976
3 Claims. (Cl. 88—23)

This invention relates to photometers and particularly to a relative intensity photometer whereby the relative intensity of a light source can be determined against a standard.

There has long been a need for a compact, accurate and simple relative intensity photometer whereby the intensity of a light source can be determined. This is particularly true in the field of photography where the intensity of light reflected from an object to be photographed determines the setting and operation of the camera. Many types of photometers have been heretofore proposed for determining the relative intensity of light sources. In general, these photometers are based upon the use of relatively complex electronic circuits using calibrated photocells or upon relatively complex optical systems or upon combinations of photocells and complex optical systems. Such photometers are expensive, difficult to maintain and sensitive to shock and misuse.

I have invented a photometer which eliminates the need for complex lens systems or electronic photocell systems. The photometer of my invention is inexpensive to produce, easily maintained, simple to operate and relatively insensitive to misuse.

I provide a housing, having spaced front and rear walls, openings through the front and rear walls, transmitting light through the housing, transparent light diffusing means in at least one of said openings, a light source in said housing behind one of said light diffusing means, a light shield around said light source limiting the area of light directed to the light diffusing means and calibrated means for varying the intensity of said light source. Preferably, each opening is provided with a frosted glass which acts as the light diffusing means. The frosted glass is preferably frosted on both sides. Preferably, a light filter capable of producing substantially monochromatic light, such, for example, as a red glass, is provided adjacent one of said frosted glass members.

In the foregoing statement, I have set out certain objects, advantages and features of my invention. Other objects, advantages and features of my invention will become apparent from a consideration of the following description and the accompanying drawings in which.

Figure 1:
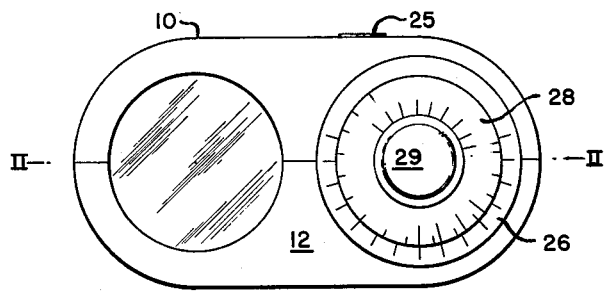
FIGURE 1 is a side elevation of a preferred form of photometer incorporating my invention.
Figure 2:
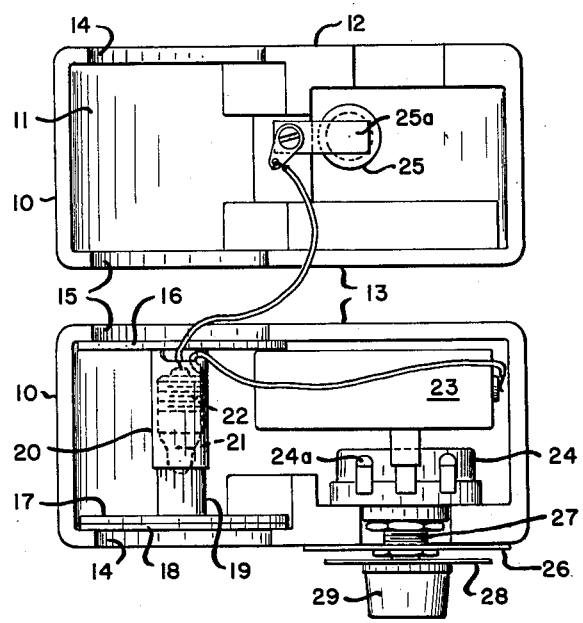
FIGURE 2 is a plan view of the two halves of the photometer of FIGURE 1 opened on the line II—II of FIGURE 1.

Referring to the drawings, I have illustrated a relative intensity photometer having an outer housing 10 of rectangular shape. A light passageway 11 is provided within the housing 10 and extends from a front wall 12 to a rear wall 13 of the housing terminating adjacent openings 14 and 15 through the said front and rear walls. A frosted glass 16 is provided in the opening 15 at the rear wall. Another frosted glass 17 is provided in the front wall 12 in opening 14. A red or other colored glass 18 which acts as a color filter to produce substantial monochromatic light is inserted between frosted glass 17 and the front wall 12. A pair of short coaxial cylinders 19 and 20 are provided within the housing behind the opening 14. Cylinder 19 opens against frosted glass 17 and covers a restricted area of that glass. A source of light 21, such as a flashlight bulb is mounted in a base 22 in the cylinder 20 to direct light through cylinder 19 against the restricted area on the frosted glass 17. Preferably, the bulb is one which is designed to and will produce a diffuse light. Diffuse light may be produced, however, by shielding the center of the bulb. Electric current for lighting the lamp 21 is supplied by mercury cells 23 within the housing. The intensity of the light produced by the lamp is regulated by a rheostat 24. In the lamp circuit, a push button switch 25 is provided to close the circuit by forcing contact member 25a against terminal 24a of the rheostat when it is desired to make an intensity determination. The housing is provided with a calibrated plate 26, calibrated in "f" values and the shaft 27 of the rheostat is provided with a calibrated plate 28 carrying film speed values and shutter speed values. The rheostat 24 is actuated by a rheostat knob 29 mounted on the end of the shaft 27 externally of the housing.

When it is desired to make a relative intensity light measurement, the housing is held with the opening 15 aimed at the light source whose intensity is to be determined. The operator looks into opening 14 and presses the button 25 to energize the lamp. The intensity of the lamp 22 is adjusted by rheostat knob 29 until the light in opening 14 produced by the passage of light through the housing and in the restricted area covered by cylinder 19 is substantially uniform. The "f" value, shutter speed and film speed readings are then taken from plates 26 and 28.

Figure 3:
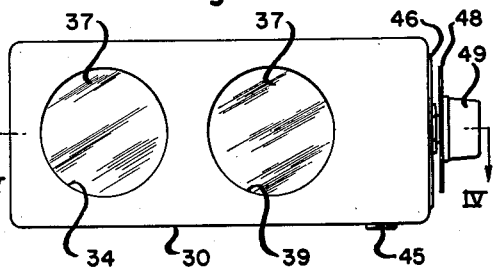
FIGURE 3 is a side elevation of a second embodiment of my invention.
Figure 4:
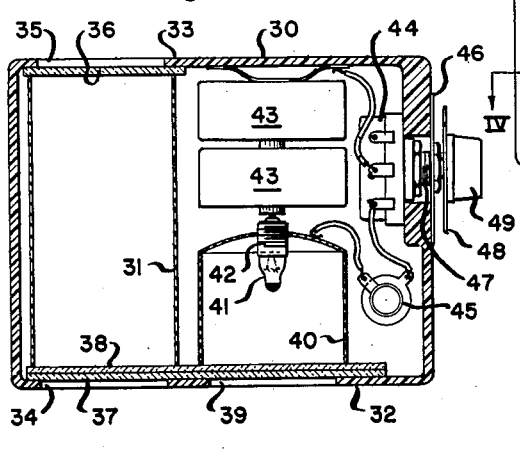
FIGURE 4 is a section on the line IV—IV of FIGURE 3.

In the alternative embodiment shown in FIGURES 3 and 4, I have illustrated a relative intensity photometer having an outer housing 30 of rectangular shape. A tube 31 is provided within the housing 30 and extends from a front wall 32 to a rear wall 33 of the housing terminating adjacent openings 34 and 35 through the said front and rear walls. A frosted glass 36 is provided between the opening 35 and the tube 31 at the rear wall. Another frosted glass 37 is provided at the opposite end of tube 31 between the tube end and opening 34. A red or other colored glass 38 which acts as a color filter to produce substantial monochromatic light is inserted between frosted glass 37 and the end of the tube 31. A second opening 39 is provided in the front wall 32 adjacent the opening 34. A short cylinder 40 is provided within the housing behind the opening 39. The frosted glass 37 and red glass 38 are extended across the opening 39 between the opening and the cylinder 40. A source of light 41, such as a flashlight bulb is mounted in a base 42 in the cylinder 40. Preferably, the bulb is one which is designed to and will produce a diffuse light as in the case of the preferred embodiment described above. Electric current for lighting the lamp 41 is supplied by mercury cells 43 within the housing. The intensity of the light produced by the lamp is regulated by a rheostat 44. In the lamp circuit, a push button 45 is provided to close the circuit when it is desired to make an intensity determination. The housing is provided with a calibrated plate 46, calbrated in "f" values and the shaft 47 of the rheostat is provided with a calibrated plate 48 carrying film speed and shutter speed values. The rheostat 44 is actuated by a rheostat knob 49 mounted on the end of the shaft 47 externally of the housing.

When it is desired to make a relative intensity light measurement, the housing is held with the opening 35 aimed at the light source whose intensity is to be determined. The operator looks into openings 34 and 39 and presses the button 45 to energize the lamp. The intensity of the lamp 42 is adjusted by rheostat knob 49 until the light in openings 14 and 19 is substantially uniform. The "f" value and the film and shutter speed readings are then taken from plates 26 and 28.

It is apparent from the foregoing description that the photometer of the present invention is exceedingly simple and free from sensitive complicated electronic and lens systems and can be inexpensively produced and maintained.

While I have illustrated and described certain preferred embodiments of the photometer of this invention as embodied in a light meter for photographic use, it will be understood that the invention may be otherwise embodied within the scope of the following claims.

I claim:

1. A relative intensity photometer comprising a housing having spaced front and rear walls, said walls having in line openings therein, a passage in the housing between said openings, transparent light diffusing means in at least one opening, a light shield in the housing coaxially with the passage in the housing opening through said light diffusing means, a light source in said shield to form adjacent comparison areas on said light diffusing means between light pasing through the housing and light from the light source and calibrated means varying the intensity of the light source.

2. A relative intensity photometer comprising a housing having spaced front and rear walls, said walls having in line openings therein, a passage in the housing between said openings, transparent light diffusing means in at least one of said openings, a monochromatic filter adjacent said light diffusing means, a light shield in said housing coaxially with the passage opening through said light diffusing means and filter, a light source in said shield to form adjacent comparison areas on said light diffusing means between light passing through the housing and light from the light source and calibrated means varying the intensity of the light source.

3. A relative intensity photometer comprising a housing having spaced front and rear walls, said walls having in line openings therein, a passage in the housing between said openings, frosted glass covers over each of said openings, a monochromatic filter adjacent one of said frosted glass covers, a tubular member in the housing coaxially with the passage and opening against the monochromatic filter and frosted glass to cover a limited area thereof, a light source in said shield to form adjacent comparison areas on said light diffusing means between light passing through the housing and light from the light source and calibrated means varying the intensity of the light source.

References Cited in the file of this patent

UNITED STATES PATENTS

| | | |
|---|---|---|
| 1,315,972 | Lacroix et al. | Sept. 16, 1919 |
| 1,437,399 | Comstock | Dec. 5, 1922 |
| 2,051,208 | Greenwood | Aug. 18, 1936 |
| 2,147,902 | Jakosky | Feb. 21, 1939 |
| 2,282,253 | Shaub | May 5, 1942 |
| 2,303,905 | Bender | Dec. 1, 1942 |
| 2,400,096 | Bradley | May 14, 1946 |
| 2,649,017 | McCarty | Aug. 18, 1953 |

FOREIGN PATENTS

| | | |
|---|---|---|
| 153,323 | Great Britain | Feb. 24, 1921 |
| 255,165 | Italy | Oct. 11, 1927 |
| 736,597 | France | May 3, 1932 |